United States Patent
Holmer et al.

(10) Patent No.: US 9,106,787 B1
(45) Date of Patent: Aug. 11, 2015

(54) APPARATUS AND METHOD FOR MEDIA TRANSMISSION BANDWIDTH CONTROL USING BANDWIDTH ESTIMATION

(75) Inventors: Stefan Holmer, Stockholm (SE); Henrik Fahlberg Lundin, Sollentuna (SE)

(73) Assignee: GOOGLE INC., Mountain View, CA (US)

( * ) Notice: Subject to any disclaimer, the term of this patent is extended or adjusted under 35 U.S.C. 154(b) by 551 days.

(21) Appl. No.: 13/103,181

(22) Filed: May 9, 2011

(51) Int. Cl.
| | |
|---|---|
| H04N 7/12 | (2006.01) |
| H04N 11/02 | (2006.01) |
| H04N 11/04 | (2006.01) |
| H04B 1/66 | (2006.01) |
| G01R 31/08 | (2006.01) |
| G06F 11/00 | (2006.01) |
| G08C 15/00 | (2006.01) |
| H04J 1/16 | (2006.01) |

(Continued)

(52) U.S. Cl.
CPC ............... *H04N 7/12* (2013.01); *H04L 47/10* (2013.01); *H04L 47/2416* (2013.01); *H04L 47/27* (2013.01); *H04L 49/90* (2013.01); *H04N 19/0006* (2013.01); *H04N 19/0089* (2013.01); *H04N 19/00266* (2013.01); *H04N 19/00781* (2013.01); *H04N 19/00884* (2013.01); *H04N 21/2662* (2013.01); *H04L 1/005* (2013.01); *H04L 43/0888* (2013.01); *H04L 69/16* (2013.01)

(58) Field of Classification Search
CPC ............... H04N 19/00781; H04N 19/00266; H04N 19/0006; H04N 19/0089; H04N 19/00884; H04N 21/2662; H04L 47/10; H04L 49/90; H04L 43/0888; H04L 47/2416; H04L 69/16; H04L 47/22

USPC ....................... 375/240.01; 370/252
See application file for complete search history.

(56) References Cited

U.S. PATENT DOCUMENTS

| | | | |
|---|---|---|---|
| 5,452,435 | A | 9/1995 | Malouf et al. |
| 5,638,114 | A | 6/1997 | Hatanaka et al. |

(Continued)

FOREIGN PATENT DOCUMENTS

| | | |
|---|---|---|
| EP | 1777969 | 4/2007 |
| JP | 0715711 | 1/1995 |

(Continued)

OTHER PUBLICATIONS

Hartikainen, E. and Ekelin, S. Tuning the Temporal Characteristics of a Kalman-Filter Method for End-to-End Bandwidth Estimation. IEEE E2EMON. Apr. 3, 2006.

(Continued)

*Primary Examiner* — Frederick Bailey
*Assistant Examiner* — Farhan Mahmud
(74) *Attorney, Agent, or Firm* — Young Basile Hanlon & MacFarlane P.C.

(57) ABSTRACT

A system, apparatus, and method for estimating available bandwidth for transmitting a media stream over a network, the media stream having a plurality of frames. One method includes receiving some of the plurality of frames, each frame of the plurality of frames having a inter-frame size differential and an inter-arrival time differential, detecting whether at least some of the inter-arrival time differentials are outside of a steady-state range using at least some of the inter-frame size differentials, and estimating an available bandwidth based on the detected change and using a processor.

24 Claims, 10 Drawing Sheets

(51) Int. Cl.
*H04L 12/26* (2006.01)
*H04N 19/172* (2014.01)
*H04N 19/61* (2014.01)
*H04N 19/115* (2014.01)
*H04N 21/2662* (2011.01)
*H04N 19/70* (2014.01)
*H04N 19/80* (2014.01)
*H04L 12/801* (2013.01)
*H04L 12/807* (2013.01)
*H04L 12/853* (2013.01)
*H04L 12/861* (2013.01)
*H04L 1/00* (2006.01)
*H04L 29/06* (2006.01)

(56) References Cited

U.S. PATENT DOCUMENTS

| | | | |
|---|---|---|---|
| 5,731,840 A | 3/1998 | Kikuchi et al. | |
| 5,801,756 A | 9/1998 | Iizawa | |
| 6,021,213 A | 2/2000 | Helterbrand et al. | |
| 6,025,870 A | 2/2000 | Hardy | |
| 6,091,777 A | 7/2000 | Guetz et al. | |
| 6,195,391 B1 | 2/2001 | Hancock et al. | |
| 6,204,847 B1 | 3/2001 | Wright | |
| 6,243,683 B1 | 6/2001 | Peters | |
| 6,266,337 B1 | 7/2001 | Marco | |
| 6,346,963 B1 | 2/2002 | Katsumi | |
| 6,363,067 B1* | 3/2002 | Chung | 370/364 |
| 6,421,387 B1 | 7/2002 | Rhee | |
| 6,462,791 B1 | 10/2002 | Zhu | |
| 6,483,454 B1 | 11/2002 | Torre et al. | |
| 6,556,588 B2 | 4/2003 | Wan et al. | |
| 6,577,333 B2 | 6/2003 | Tai et al. | |
| 6,587,985 B1 | 7/2003 | Fukushima et al. | |
| 6,681,362 B1 | 1/2004 | Abbott et al. | |
| 6,684,354 B2 | 1/2004 | Fukushima et al. | |
| 6,707,852 B1 | 3/2004 | Wang | |
| 6,711,209 B1 | 3/2004 | Lainema et al. | |
| 6,728,317 B1 | 4/2004 | Demos | |
| 6,732,313 B2 | 5/2004 | Fukushima et al. | |
| 6,741,569 B1 | 5/2004 | Clark | |
| 6,812,956 B2 | 11/2004 | Ferren et al. | |
| 6,816,836 B2 | 11/2004 | Basu et al. | |
| 6,918,077 B2 | 7/2005 | Fukushima et al. | |
| 6,952,450 B2 | 10/2005 | Cohen | |
| 7,007,098 B1 | 2/2006 | Smyth et al. | |
| 7,007,235 B1 | 2/2006 | Hussein et al. | |
| 7,015,954 B1 | 3/2006 | Foote et al. | |
| 7,114,129 B2 | 9/2006 | Awada et al. | |
| 7,124,333 B2 | 10/2006 | Fukushima et al. | |
| 7,178,106 B2 | 2/2007 | Lamkin et al. | |
| 7,180,896 B1 | 2/2007 | Okumura | |
| 7,197,070 B1 | 3/2007 | Zhang et al. | |
| 7,219,062 B2 | 5/2007 | Colmenarez et al. | |
| 7,263,644 B2 | 8/2007 | Park et al. | |
| 7,356,750 B2 | 4/2008 | Fukushima et al. | |
| 7,372,834 B2 | 5/2008 | Kim et al. | |
| 7,376,880 B2 | 5/2008 | Ichiki et al. | |
| 7,379,653 B2 | 5/2008 | Yap et al. | |
| 7,424,056 B2 | 9/2008 | Lin et al. | |
| 7,447,235 B2 | 11/2008 | Luby et al. | |
| 7,447,969 B2 | 11/2008 | Park et al. | |
| 7,484,157 B2 | 1/2009 | Park et al. | |
| 7,577,898 B2 | 8/2009 | Costa et al. | |
| 7,636,298 B2 | 12/2009 | Miura et al. | |
| 7,664,185 B2 | 2/2010 | Zhang et al. | |
| 7,664,246 B2 | 2/2010 | Krantz et al. | |
| 7,680,076 B2 | 3/2010 | Michel et al. | |
| 7,684,982 B2 | 3/2010 | Taneda | |
| 7,710,973 B2 | 5/2010 | Rumbaugh et al. | |
| 7,735,111 B2 | 6/2010 | Michener et al. | |
| 7,739,714 B2 | 6/2010 | Guedalia | |
| 7,756,127 B2 | 7/2010 | Nagai et al. | |
| 7,797,274 B2 | 9/2010 | Strathearn et al. | |
| 7,822,607 B2 | 10/2010 | Aoki et al. | |
| 7,823,039 B2 | 10/2010 | Park et al. | |
| 7,860,718 B2 | 12/2010 | Lee et al. | |
| 7,864,210 B2 | 1/2011 | Kennedy | |
| 7,974,243 B2 | 7/2011 | Nagata et al. | |
| 8,010,185 B2 | 8/2011 | Ueda | |
| 8,019,175 B2 | 9/2011 | Lee et al. | |
| 8,060,651 B2 | 11/2011 | Deshpande et al. | |
| 8,085,767 B2 | 12/2011 | Lussier et al. | |
| 8,087,056 B2 | 12/2011 | Ryu | |
| 8,130,823 B2 | 3/2012 | Gordon et al. | |
| 8,161,159 B1 | 4/2012 | Shetty et al. | |
| 8,175,041 B2 | 5/2012 | Shao et al. | |
| 8,176,524 B2 | 5/2012 | Singh et al. | |
| 8,179,983 B2 | 5/2012 | Gordon et al. | |
| 8,233,539 B2 | 7/2012 | Kwon | |
| 8,265,450 B2 | 9/2012 | Black et al. | |
| 8,307,403 B2 | 11/2012 | Bradstreet et al. | |
| 8,443,398 B2 | 5/2013 | Swenson et al. | |
| 8,448,259 B2 | 5/2013 | Haga et al. | |
| 8,494,053 B2 | 7/2013 | He et al. | |
| 8,553,776 B2 | 10/2013 | Shi et al. | |
| 8,566,886 B2 | 10/2013 | Scholl | |
| 2002/0085637 A1 | 7/2002 | Henning | |
| 2002/0140851 A1 | 10/2002 | Laksono | |
| 2002/0152318 A1 | 10/2002 | Menon et al. | |
| 2002/0157058 A1 | 10/2002 | Ariel et al. | |
| 2002/0176604 A1 | 11/2002 | Shekhar et al. | |
| 2002/0191072 A1 | 12/2002 | Henrikson | |
| 2003/0012287 A1 | 1/2003 | Katsavounidis et al. | |
| 2003/0016630 A1* | 1/2003 | Vega-Garcia et al. | 370/252 |
| 2003/0061368 A1 | 3/2003 | Chaddha | |
| 2003/0098992 A1 | 5/2003 | Park et al. | |
| 2003/0226094 A1 | 12/2003 | Fukushima et al. | |
| 2003/0229822 A1 | 12/2003 | Kim et al. | |
| 2003/0229900 A1 | 12/2003 | Reisman | |
| 2004/0071170 A1 | 4/2004 | Fukuda | |
| 2004/0105004 A1 | 6/2004 | Rui et al. | |
| 2004/0165585 A1 | 8/2004 | Imura et al. | |
| 2004/0172252 A1 | 9/2004 | Aoki et al. | |
| 2004/0172255 A1 | 9/2004 | Aoki et al. | |
| 2004/0184444 A1 | 9/2004 | Aimoto et al. | |
| 2004/0196902 A1 | 10/2004 | Faroudja | |
| 2004/0233938 A1 | 11/2004 | Yamauchi | |
| 2005/0041150 A1 | 2/2005 | Gewickey et al. | |
| 2005/0076272 A1 | 4/2005 | Delmas et al. | |
| 2005/0117653 A1 | 6/2005 | Sankaran | |
| 2005/0125734 A1 | 6/2005 | Mohammed et al. | |
| 2005/0154965 A1 | 7/2005 | Ichiki et al. | |
| 2005/0157793 A1 | 7/2005 | Ha et al. | |
| 2005/0180415 A1 | 8/2005 | Cheung et al. | |
| 2005/0185715 A1 | 8/2005 | Karczewicz et al. | |
| 2005/0220188 A1 | 10/2005 | Wang | |
| 2005/0251856 A1 | 11/2005 | Araujo et al. | |
| 2005/0259729 A1 | 11/2005 | Sun | |
| 2006/0013310 A1 | 1/2006 | Lee et al. | |
| 2006/0039470 A1 | 2/2006 | Kim et al. | |
| 2006/0066717 A1 | 3/2006 | Miceli | |
| 2006/0143678 A1* | 6/2006 | Chou et al. | 725/118 |
| 2006/0146940 A1 | 7/2006 | Gomila et al. | |
| 2006/0150055 A1 | 7/2006 | Quinard et al. | |
| 2006/0153217 A1 | 7/2006 | Chu et al. | |
| 2006/0215014 A1* | 9/2006 | Cohen et al. | 348/14.08 |
| 2006/0215752 A1 | 9/2006 | Lee et al. | |
| 2006/0247927 A1 | 11/2006 | Robbins et al. | |
| 2006/0248563 A1 | 11/2006 | Lee et al. | |
| 2006/0282774 A1 | 12/2006 | Covell et al. | |
| 2006/0291475 A1 | 12/2006 | Cohen | |
| 2007/0036354 A1 | 2/2007 | Wee et al. | |
| 2007/0064094 A1 | 3/2007 | Potekhin et al. | |
| 2007/0080971 A1 | 4/2007 | Sung | |
| 2007/0081522 A1 | 4/2007 | Apelbaum | |
| 2007/0081587 A1 | 4/2007 | Raveendran et al. | |
| 2007/0097257 A1 | 5/2007 | El-Maleh et al. | |
| 2007/0121100 A1 | 5/2007 | Divo | |
| 2007/0168824 A1 | 7/2007 | Fukushima et al. | |
| 2007/0195893 A1 | 8/2007 | Kim et al. | |
| 2007/0223529 A1* | 9/2007 | Lee et al. | 370/468 |
| 2007/0237226 A1 | 10/2007 | Regunathan et al. | |

(56) References Cited

U.S. PATENT DOCUMENTS

| | | |
|---|---|---|
| 2007/0237232 A1 | 10/2007 | Chang et al. |
| 2007/0250754 A1 | 10/2007 | Costa et al. |
| 2007/0268964 A1 | 11/2007 | Zhao |
| 2007/0285505 A1 | 12/2007 | Korneliussen |
| 2008/0037624 A1 | 2/2008 | Walker et al. |
| 2008/0043832 A1 | 2/2008 | Barkley et al. |
| 2008/0072267 A1 | 3/2008 | Monta et al. |
| 2008/0089414 A1 | 4/2008 | Wang et al. |
| 2008/0101403 A1 | 5/2008 | Michel et al. |
| 2008/0109707 A1 | 5/2008 | Dell et al. |
| 2008/0117930 A1* | 5/2008 | Chakareski et al. ......... 370/465 |
| 2008/0126278 A1 | 5/2008 | Bronstein et al. |
| 2008/0134005 A1 | 6/2008 | Izzat et al. |
| 2008/0144553 A1 | 6/2008 | Shao et al. |
| 2008/0209300 A1 | 8/2008 | Fukushima et al. |
| 2008/0250294 A1 | 10/2008 | Ngo et al. |
| 2008/0260042 A1 | 10/2008 | Shah et al. |
| 2008/0270528 A1 | 10/2008 | Girardeau et al. |
| 2008/0273591 A1 | 11/2008 | Brooks et al. |
| 2009/0006927 A1 | 1/2009 | Sayadi et al. |
| 2009/0007159 A1 | 1/2009 | Rangarajan et al. |
| 2009/0010325 A1* | 1/2009 | Nie et al. ................ 375/240.01 |
| 2009/0013086 A1 | 1/2009 | Greenbaum |
| 2009/0022157 A1 | 1/2009 | Rumbaugh et al. |
| 2009/0031390 A1 | 1/2009 | Rajakarunanayake et al. |
| 2009/0059067 A1 | 3/2009 | Takanohashi et al. |
| 2009/0059917 A1 | 3/2009 | Lussier et al. |
| 2009/0080510 A1 | 3/2009 | Wiegand et al. |
| 2009/0103635 A1 | 4/2009 | Pahalawatta |
| 2009/0122867 A1 | 5/2009 | Mauchly et al. |
| 2009/0125812 A1 | 5/2009 | Blinnikka et al. |
| 2009/0138784 A1 | 5/2009 | Tamura et al. |
| 2009/0144417 A1 | 6/2009 | Kisel et al. |
| 2009/0161763 A1 | 6/2009 | Rossignol et al. |
| 2009/0180537 A1 | 7/2009 | Park et al. |
| 2009/0237728 A1 | 9/2009 | Yamamoto |
| 2009/0238277 A1 | 9/2009 | Meehan |
| 2009/0241147 A1 | 9/2009 | Kim et al. |
| 2009/0245351 A1 | 10/2009 | Watanabe |
| 2009/0249158 A1 | 10/2009 | Noh et al. |
| 2009/0254657 A1 | 10/2009 | Melnyk et al. |
| 2009/0268819 A1 | 10/2009 | Nishida |
| 2009/0276686 A1 | 11/2009 | Liu et al. |
| 2009/0276817 A1 | 11/2009 | Colter et al. |
| 2009/0307428 A1 | 12/2009 | Schmieder et al. |
| 2009/0322854 A1 | 12/2009 | Ellner |
| 2010/0026608 A1 | 2/2010 | Adams et al. |
| 2010/0040349 A1 | 2/2010 | Landy |
| 2010/0054333 A1* | 3/2010 | Bing et al. ............... 375/240.12 |
| 2010/0077058 A1 | 3/2010 | Messer |
| 2010/0122127 A1 | 5/2010 | Oliva et al. |
| 2010/0149301 A1 | 6/2010 | Lee et al. |
| 2010/0153828 A1 | 6/2010 | De Lind Van Wijngaarden et al. |
| 2010/0171882 A1 | 7/2010 | Cho et al. |
| 2010/0192078 A1 | 7/2010 | Hwang et al. |
| 2010/0202414 A1 | 8/2010 | Malladi et al. |
| 2010/0220172 A1 | 9/2010 | Michaelis |
| 2010/0235583 A1 | 9/2010 | Gokaraju et al. |
| 2010/0235820 A1 | 9/2010 | Khouzam et al. |
| 2010/0306618 A1 | 12/2010 | Kim et al. |
| 2010/0309372 A1 | 12/2010 | Zhong |
| 2010/0309982 A1 | 12/2010 | Le Floch et al. |
| 2011/0010629 A1 | 1/2011 | Castro et al. |
| 2011/0033125 A1 | 2/2011 | Shiraishi |
| 2011/0069890 A1 | 3/2011 | Besley |
| 2011/0093273 A1 | 4/2011 | Lee et al. |
| 2011/0103480 A1 | 5/2011 | Dane |
| 2011/0131144 A1 | 6/2011 | Ashour et al. |
| 2011/0158529 A1 | 6/2011 | Malik |
| 2011/0194605 A1 | 8/2011 | Amon et al. |
| 2011/0218439 A1 | 9/2011 | Masui et al. |
| 2011/0219331 A1 | 9/2011 | DeLuca et al. |
| 2012/0013705 A1 | 1/2012 | Taylor et al. |
| 2012/0084821 A1 | 4/2012 | Rogers |
| 2012/0110443 A1 | 5/2012 | Lemonik et al. |
| 2012/0206562 A1 | 8/2012 | Yang et al. |
| 2013/0031441 A1 | 1/2013 | Ngo et al. |

FOREIGN PATENT DOCUMENTS

| | | |
|---|---|---|
| WO | WO0249356 | 6/2002 |
| WO | 2008006062 A1 | 1/2008 |

OTHER PUBLICATIONS

International Search Report and Written Opinion Dated Aug. 13, 2012, in PCT/US2012/034426.

Chen, Yu, et al., "An Error Concealment Algorithm for Entire Frame Loss in Video Transmission," Picture Coding Symposium, 2004.

European Search Report for European Patent Application No. 08146463.1 dated Jun. 23, 2009.

Feng, Wu-chi; Rexford, Jennifer; "A Comparison of Bandwidth Smoothing Techniques for the Transmission of Prerecorded Compressed Video", Paper, 1992, 22 pages.

Friedman, et al., "RTP: Control Protocol Extended Reports (RTPC XR)," Network Working Group RFC 3611 (The Internet Society 2003) (52 pp).

Frossard, Pascal; "Joint Source/FEC Rate Selection for Quality-Optimal MPEG-2 Video Delivery", IEEE Transactions on Image Processing, vol. 10, No. 12, (Dec. 2001) pp. 1815-1825.

International Search Report and Written Opinion for International Application No. PCT/US2011/051818 dated Nov. 21, 2011 (16 pages).

International Search Report for International Application No. PCT/EP2009/057252 mailed on Aug. 27, 2009.

JongWon Kim, Young-Gook Kim, HwangJun Song, Tien-Ying Kuo, Yon Jun Chung, and C.-C. Jay Kuo; "TCP-friendly Internet Video Streaming employing Variable Frame-rate Encoding and Interpolation"; IEEE Trans. Circuits Syst. Video Technology, Jan. 2000; vol. 10 pp. 1164-1177

Khronos Group Inc. OpenMAX Integration Layer Application Programming Interface Specification. Dec. 16, 2005, 326 pages, Version 1.0.

Korhonen, Jari; Frossard, Pascal; "Flexible forward error correction codes with application to partial media data recovery", Signal Processing: Image Communication vol. 24, No. 3 (Mar. 2009) pp. 229-242.

Li, A., "RTP Payload Format for Generic Forward Error Correction", Network Working Group, Standards Track, Dec. 2007, (45 pp).

Liang, Y.J.; Apostolopoulos, J.G.; Girod, B., "Analysis of packet loss for compressed video: does burst-length matter?," Acoustics, Speech and Signal Processing, 2003. Proceedings. (ICASSP '03). 2003 IEEE International conference on, vol. 5, no., pp. V, 684-7 vol. 5, Apr. 6-10, 2003.

Neogi, A., et al., Compression Techniques for Active Video Content; State University of New York at Stony Brook; Computer Science Department; pp. 1-11.

Yu, Xunqi, et al; "The Accuracy of Markov Chain Models in Predicting Packet-Loss Statistics for a Single Multiplexer", IEEE Transactions on Information Theory, vol. 54, No. 1 (Jan. 2008) pp. 489-501.

Peng, Qiang, et al., "Block-Based Temporal Error Concealment for Video Packet Using Motion Vector Extrapolation," IEEE 2003 Conference of Communications, Circuits and Systems and West Sino Expositions, vol. 1, No. 29, pp. 10-14 (IEEE 2002).

Roca, Vincent, et al., Design and Evaluation of a Low Density Generator Matrix (LDGM) Large Block FEC Codec, INRIA Rhone-Alpes, Planete project, France, Date Unknown, (12 pp).

"Rosenberg, J. D. RTCWEB I-D with thoughts on the framework. Feb. 8, 2011. Retrieved fromhttp://www.ietf.org/mail-archive/web/dispatch/current/msg03383.html on Aug. 1, 2011."

"Rosenberg, J.D., et al. An Architectural Framework for Browser based Real-Time Communications (RTC) draft-rosenberg-rtcweb-framework-00. Feb. 8, 2011. Retrieved fromhttp://www.ietf.org/id/draft-rosenberg-rtcweb-framework-00.txt on Aug. 1, 2011."

Scalable Video Coding, SVC, Annex G extension of H264.

(56) References Cited

OTHER PUBLICATIONS

Steliaros, Michael K., et al.; "Locally-accurate motion estimation for object-based video coding", SPIE vol. 3309, 1997, 11 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Strobach, Peter; "Tree-Structured Scene Adaptive Coder", IEEE Transactions on Communications, vol. 38, No. 4, Apr. 1990, 10 pp.

Wikipedia, the free encyclopedia, "Low-density parity-check code", http://en.wikipedia.org/wiki/Low-density_parity-check_code, Jul. 30, 2012 (5 pp).

Yan, Bo and Gharavi, Hamid, "A Hybrid Frame Concealment Algorithm for H.264/AVC," IEEE Transactions on Image Processing, vol. 19, No. 1, pp. 98-107 (IEEE, Jan. 2010).

Yoo, S. J.B., "Optical Packet and burst Switching Technologies for the Future Photonic Internet," Lightwave Technology, Journal of, vol. 24, No. 12, pp. 4468, 4492, Dec. 2006.

Chae-Eun Rhee et al. (:A Real-Time H.264/AVC Encoder with Complexity-Aware Time Allocation, Circuits and Systems for video Technology, IEEE Transactions on, vol. 20, No. 12, pp. 1848, 1862, Dec. 2010).

Gachetti (Matching techniques to compute image motion, Image and Vision Computing, vol. 18, No. 3, Feb. 2000, pp. 247-260.

Ahn et al., Flat-region Detection and False Contour Removal in the Digital TV Display, http://www.cecs.uci.edu/~papers/icme05/defevent/papers/cr1737.pdf., ICME 2005.

Daly et al., Decontouring: Prevention and Removal of False Contour Artifacts, from Conference vol. 5292, Human Vision and Electronic Imaging IX, Jun. 7, 2004.

* cited by examiner

APPARATUS AND METHOD FOR MEDIA TRANSMISSION BANDWIDTH CONTROL USING BANDWIDTH ESTIMATION

TECHNICAL FIELD

The present invention relates in general to media encoding and decoding.

BACKGROUND

An increasing number of applications today make use of digital media for various purposes including, for example, remote business meetings via video conferencing, high definition video entertainment, video advertisements, and sharing of user-generated videos. As technology is evolving, users have higher expectations for media quality and, for example, expect high resolution video even when transmitted over communications channels having limited bandwidth.

To permit transmission of digital media streams while limiting bandwidth consumption, a number of video compression schemes have been devised, including formats such as VPx, promulgated by Google, Inc. of Mountain View, California, and H.264, a standard promulgated by ITU-T Video Coding Experts Group (VCEG) and the ISO/TEC Moving Picture Experts Group (MPEG), including present and future versions thereof. H.264 is also known as MPEG-4 Part 10 or MPEG-4 AVC (formally, ISO/TEC 14496-10).

One type of media transmission includes real-time encoding and transmission, in which the receiver of a media stream decodes and renders media data (i.e. video frames) as it is received. For example, in a real-time video implementation, if video is encoded at a bitrate greater than the available bandwidth of the networks over which it is to be transmitted, portions of the encoded video stream may not be able to be received and decoded by the receiver in real-time.

SUMMARY

Disclosed herein are embodiments of methods and apparatuses for determining an estimated available bandwidth.

Included in the disclosed embodiments is a method for determining an estimated available bandwidth for transmitting a media stream over a network, the media stream having a plurality of frames. The method includes receiving some of the plurality of frames, determining an inter-arrival time differential d for each of the received frames, the inter-arrival time differential $d_i$ for a current frame i calculated using a formula $d_i=(t_i-t_{i-1})-(T_i-T_{i-1})$, wherein: $t_i$ is a receive time of a current frame i, $t_{i-1}$ is a receive time of a previous frame i−1 that immediately precedes the current frame i, $T_i$ is a timestamp of the current frame i, and $T_{i-1}$ is a timestamp of the previous frame i−1, determining an inter-frame size differential dL for each of the received frames, the inter-frame size differential $dL_i$ for a current frame i calculated as the difference between a frame size of the current frame i and a frame size of the previous frame i−1, determining an estimated function having a slope $C_i^{-1}$ and an offset $m_i$ based on at least some of the inter-arrival time differentials and inter-frame size differentials, and determining the estimated available bandwidth based on a comparison between the offset $m_i$ and one or more thresholds.

Included in the disclosed embodiments is a method for regulating a bitrate of a media stream encoded by a transmitting station based on an estimated available bandwidth determined by a receiving station, the media stream having a plurality of frames. The method includes receiving some of the plurality of frames by the receiving station, the received frames each having an inter-arrival time differential and a inter-frame size differential, estimating an offset $m_i$ of the inter-arrival time differential, detecting an available bandwidth over-use if the offset $m_i$ is greater than a positive threshold, detecting an available bandwidth under-use if the offset $m_i$ is less than a negative threshold, determining the estimated available bandwidth based on whether there is a detected over-use or under-use using a processor, and regulating the bitrate of the encoded media stream by sending the estimated available bandwidth to the transmitting station.

Included in the disclosed embodiments is a method for estimating available bandwidth for transmitting a media stream over a network, the media stream having a plurality of frames. The method includes receiving some of the plurality of frames, each frame of the plurality of frames having an inter-frame size differential and an inter-arrival time differential, detecting if at least some of the inter-arrival time differentials are outside of a steady-state range using at least some of the inter-frame size differentials, and estimating an available bandwidth based on the detection using a processor.

Included in the disclosed embodiments is a computing device for estimating available bandwidth for transmitting a media stream over a network, the media stream having a plurality of frames. The computing device includes a memory and a processor configured to execute instructions stored in the memory to: receive some of the plurality of frames, each frame of the plurality of frames having an inter-frame size differential and an inter-arrival time differential, detect whether at least some of the inter-arrival time differentials are outside of a steady-state range using at least some of the inter-frame size differentials, and estimate an available bandwidth based on the detection.

Included in the disclosed embodiments is a computing device for estimating available bandwidth for transmitting a media stream over a network, the media stream having a plurality of frames. The computing device includes a RTP receiver configured to receive frames of a media stream from a network, each frame having an inter-arrival time differential and an inter-frame size differential, an adaptive filter configured to determine an estimated function of inter-arrival time differential and inter-frame size differential for the received frames, the estimated function having a slope and an offset, an over-use detector configured to detect an over-use or under-use of the network based on a comparison between the offset and one or more pre-determined thresholds, and a remote rate-control configured to determine an estimated available bandwidth based on the detection of an over-use or under-use by the over-use detector.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
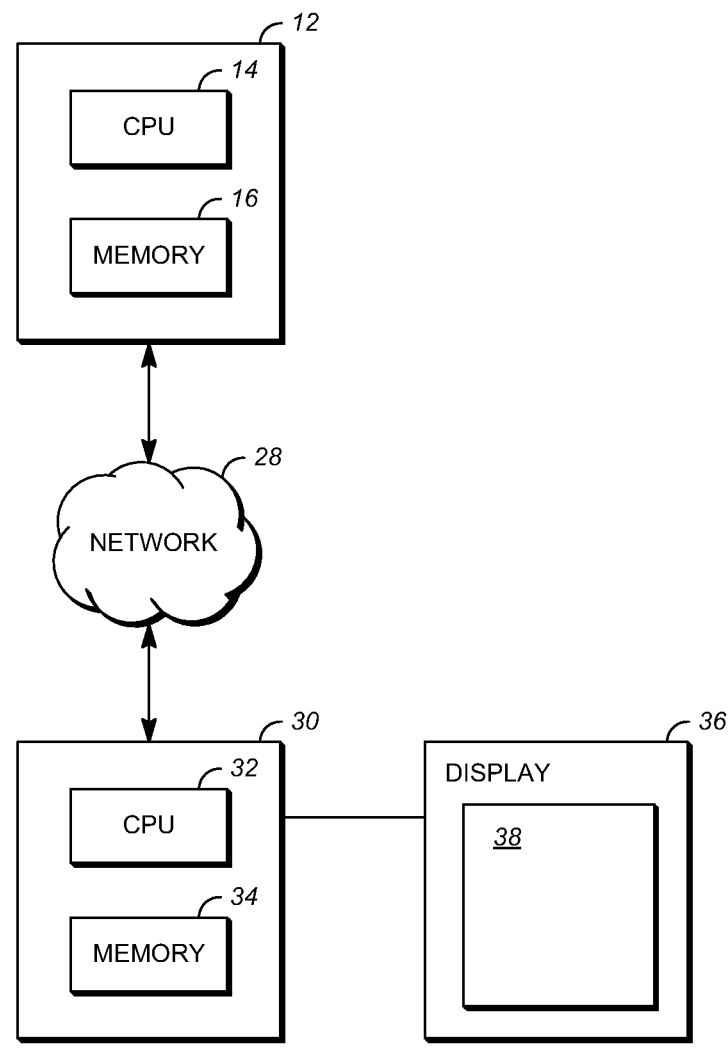
FIG. 1 is a schematic of a media encoding and decoding system.

FIG. 1 is a diagram of an encoder and decoder system 10 for media streams. As used herein, a media stream can include a video stream, an audio stream, a combined video and audio stream, or any other multimedia bitstream. Any description herein related to a specific type of media stream, such as a video stream, can be also applied to other types of media streams.

An exemplary transmitting station 12 may be, for example, a computer having an internal configuration of hardware including a processor such as a central processing unit (CPU) 14 and a memory 16. CPU 14 can be a controller for controlling the operations of transmitting station 12. The CPU 14 is connected to memory 16 by, for example, a memory bus. Memory 16 may be random access memory (RAM) or any other suitable memory device. Memory 16 can store data and program instructions which are used by the CPU 14. Other suitable implementations of transmitting station 12 are possible.

A network 28 connects transmitting station 12 and a receiving station 30 for transmission of an encoded media stream. Specifically, the media stream can be encoded by an encoder in transmitting station 12 and the encoded media stream can be decoded by a decoder in receiving station 30. Network 28 may, for example, be the Internet, which is a packet-switched network. Network 28 may also be a local area network (LAN), wide area network (WAN), virtual private network (VPN), or any other means of transferring the media stream from transmitting station 12.

The transmission of the encoded media stream can be accomplished using a real-time protocol, such as the real-time transport protocol (RTP) standard as promulgated by the Internet Engineering Task Force (IETF). Control of the transmission can be accomplished using the real-time transport control protocol (RTCP) defined in the RTP standard. For example, the RTCP can allow a transmitting station and receiving station to share information regarding network congestion and available bandwidth.

In one implementation, network 28 can include multiple network segments. For example, a transmission through the Internet can be routed through multiple network segments using routers that connect the network segments. The routers direct the transmission through a network path of appropriate network segments so that the transmission reaches its intended destination. Each network segment in the network path has an available bandwidth A, modeled with a fluid traffic model as follows:

$$A = C - X; \text{ wherein} \quad (1)$$

C is the network segment capacity (i.e. the segment's maximum bandwidth); and X is the amount of cross-traffic on the network segment (i.e. the portion of the capacity that is already used).

The available bandwidth of the network path can be no larger than the smallest available bandwidth $A_{min}$ of all of the network segments within the network path. Correspondingly, the maximum bandwidth, or capacity, of the network path is equal to the network segment having the smallest capacity $C_{min}$. The network path's available bandwidth $A_{min}$ and capacity $C_{min}$ may change over time based on changing network conditions. For example, a network segment's performance may be degraded, reducing its capacity and the capacity of the network path. In another example, cross traffic over one of the network segments may reduce the available bandwidth of the network path.

The available bandwidth is the maximum data size per time period that the network is able to transmit. A bitrate is the size of an encoded media stream or other data over time. Both the bandwidth and the bitrate can be measured in bits or bytes per second.

If the media stream being transmitted has a bitrate greater than the available bandwidth, portions of the media stream will be queued within the network. The queuing can result in delayed receipt of portions of the media stream by the receiving station 30 or may result in portions of the media stream being lost during transmission. Lost portions of the media stream may be resent by the transmitting station 12, however, the resent portions can be significantly delayed—and in some cases, the resent portions can be lost as well.

Receiving station 30, in one example, can be a computer having an internal configuration of hardware including a processor such as a central processing unit (CPU) 32 and a memory 34. CPU 32 is a controller for controlling the operations of transmitting station 12. CPU 32 can be connected to memory 34 by, for example, a memory bus. Memory 34 can be RAM or any other suitable memory device. Memory 34 stores data and program instructions which are used by CPU 32. Other suitable implementations of receiving station 30 are possible.

A display 36 configured to display a video stream can be connected to receiving station 30. Display 36 may be implemented in various ways, including by a liquid crystal display (LCD) or a cathode-ray tube (CRT). The display 36 can be configured to display a rendering of a video stream decoded by the decoder in receiving station 30.

Other implementations of the encoder and decoder system 10 are possible. In one implementation, additional components may be added to the encoder and decoder system 10. For example, a display or a video camera may be attached to transmitting station 12 to capture a video stream to be encoded. In another implementation, a transport protocol other than RTP may be used.

Figure 2:
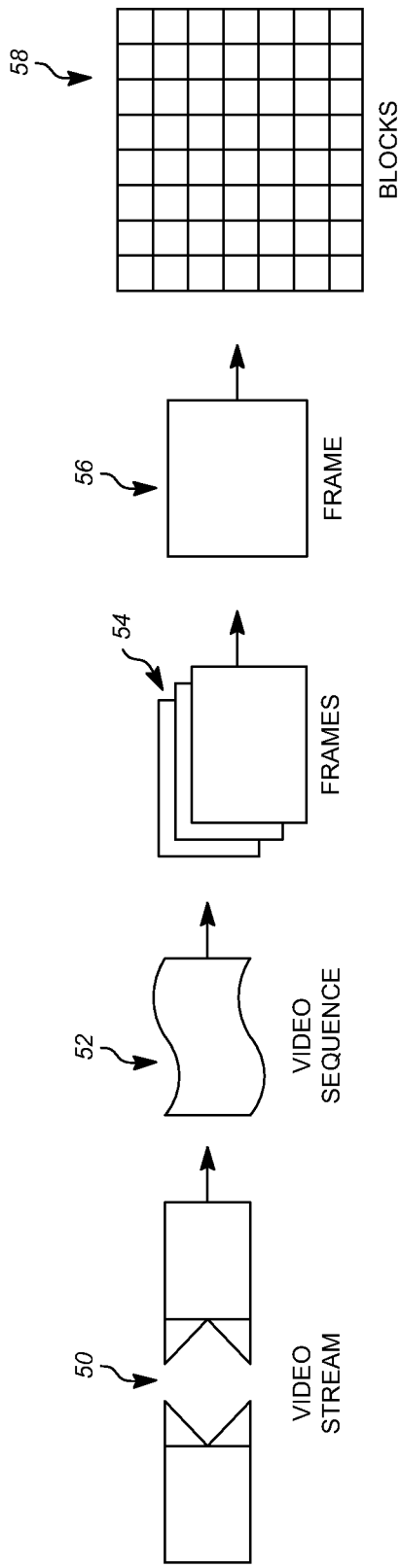
FIG. 2 is a diagram of a video stream.

FIG. 2 is a diagram of a typical video stream 50 to be encoded and decoded. Video coding formats, for example, VP8 or H.264, provide a defined hierarchy of layers for video stream 50. Video stream 50 includes a video sequence 52. At the next level, video sequence 52 consists of a number of adjacent frames 54, which can then be further subdivided into a single frame 56. At the next level, frame 56 can be divided into a series of blocks 58, which can contain data corresponding to, for example, a 16×16 block of displayed pixels in frame 56. Each block can contain luminance and chrominance data for the corresponding pixels. Blocks 58 can also be of any other suitable size such as 16×8 pixel groups or 8×16 pixel groups.

Figure 3:
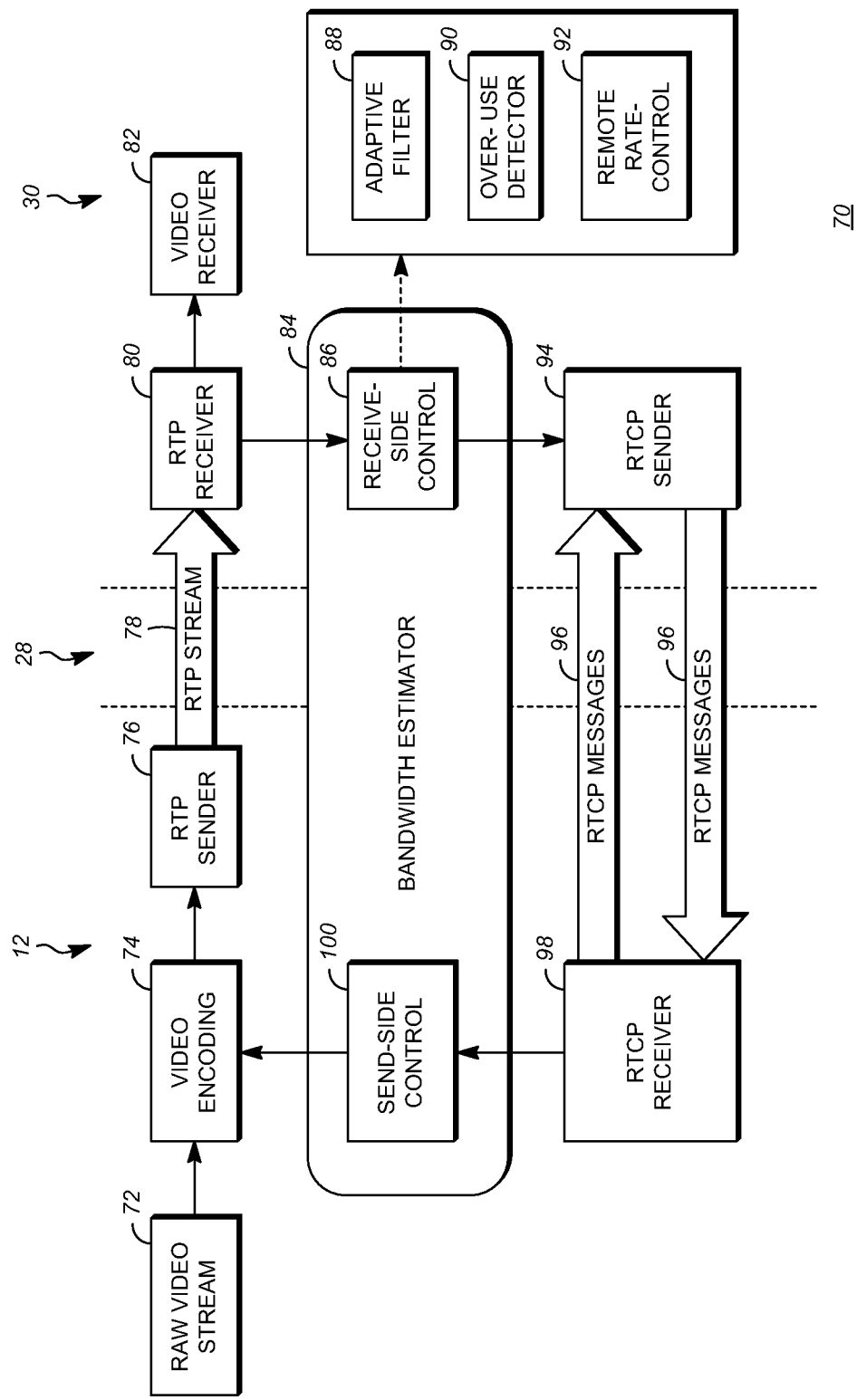
FIG. 3 is a diagram of a bandwidth estimating system within the media encoding and decoding system of FIG. 1.

FIG. 3 is a diagram 70 of a bandwidth estimating system within the media encoding and decoding system of FIG. 1. Portions of the bandwidth estimating implementation are implemented on the transmitting station 12, receiving station 30, and network 28. The diagram 70 includes stages configured to encode and transmit a real-time video stream from the transmitting station 12 to receiving station 30. The diagram 70 also includes feedback stages for estimating bandwidth configured to regulate the bitrate of the encoded real-time video stream based on an estimated available bandwidth.

A video stream 72 is input into the system. Video encoding 74 encodes the input video stream. Video encoding 74 produces an encoded video stream ata particular bitrate. The encoding can be performed using techniques such as inter-frame prediction. In inter-frame prediction, some frames (usually called P-frames) are each encoded as a residual signal that is determined using a difference between the frame being encoded and a reference frame. The difference can be determined using techniques such as motion compensation. I-frames are intra-predicted frames, and are encoded without using other frames. I-frames are typically larger than frames that are not intra-predicted (i.e. P-frames).

A RTP sender 76 packages encoded frames into packets conforming to the RTP protocol for transport. The packaging includes setting a timestamp for a packaged frame based on either the capture time (the time at which the frame was captured by, for example, a video camera) or the send time (the time at which the frame is packaged and sent). Packaged frames are transmitted in a RTP stream 78 of RTP packets over the network 28.

A RTP receiver 80 receives the RTP packets in the RTP stream 78, unpackages the encoded video stream from the RTP packets and transfers the encoded video stream to video receiver 82. Video receiver 82 decodes and renders the encoded video stream.

After receiving a frame of the encoded video stream, RTP receiver 80 sends the timestamp, encoded frame size, and the actual receive time (the time at which the frame arrived at RTP receiver 80) to receive-side control 86. Receive-side control 86 is included in bandwidth estimator 84. Receive-side control 86 is configured to determine an estimated available bandwidth for the RTP stream 78. Receive-side control 86 includes an adaptive filter 88, over-use detector 90, and remote rate-control 92.

The adaptive filter 88 determines an estimated function based on data points of the inter-arrival time differential and the inter-frame size differential of at least some of the frames that have been previously received. The estimated function includes a slope and an offset. The adaptive filter 88 and the determined estimated function will be described in more detail later. The over-use detector 90 uses a comparison of the offset of the estimated function and one or more thresholds to determine whether there is a network over-use or under-use. The over-use detector 90 will be described in more detail later.

The remote rate-control 92 determines an estimated available bandwidth for transmitting the RTP stream 78 over the network. The estimated available bandwidth is calculated based on the detection of network over-use or under-use by over-use detector 90. The remote rate-control 92 will be described in more detail later.

Once the estimated available bandwidth is determined, RTCP sender 94 is used to send the estimated available bandwidth to the transmitting station 12 via RTCP messages 96. The estimated available bandwidth is received by RTCP receiver 98 in an RTCP message. The RTCP receiver 98 extracts the estimated available bandwidth and passes it to send-side control 100. The send-side control calculates a send-side estimated available bandwidth that is bounded by the estimated available bandwidth determined by the receive-side control 86 and a value determined using the TCP throughput equation that is a part of TCP Friendly Rate Control (TFRC), promulgated by the Internet Engineering Task Force (IETF).

The bandwidth estimating system described above is only one possible implementation of the bandwidth estimating system. Other implementations are possible, including those that modify, add, or delete aspects of the system shown in FIG. 3. For example, an alternative implementation may not use the RTP and RTCP protocols and may instead use a different protocol. In another implementation, the bandwidth estimation system can be modified to estimate available bandwidth for other media streams, such as an audio stream.

When the encoding and transmission of a video stream is initialized, the bitrate of the video stream can be set to be within an expected available bandwidth of the network. The expected available bandwidth can be, for example, pre-determined or determined by either the transmitting or receiving station. One exemplary method of determining the expected available bandwidth includes performing a probe of the network. In this method, a burst of packets is sent to the receiving station by the transmitting station. The receiving station can then measure the incoming bitrate of the burst of packets to determine the expected available bandwidth. Other methods can also be used.

The actual available bandwidth $A_{min}$ may change over time, resulting in an under-use or an over-use of the available bandwidth $A_{min}$ of the network. Bandwidth estimator 84 is used to determine the estimated available bandwidth so that the bitrate of the encoded video stream can be optimized to the available bandwidth of the network. The bitrate can be optimized so that the encoded video stream takes up a majority of the available bandwidth (allowing for a higher quality video, since higher quality video generally requires a higher bitrate) and without taking up more than the available bandwidth so that transmission loss is controlled.

Figure 4:
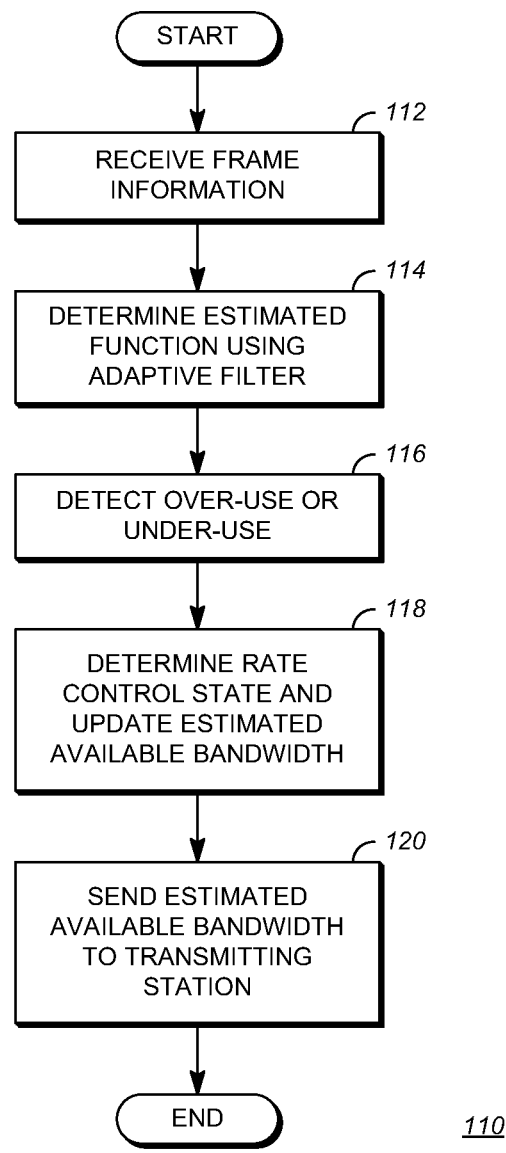
FIG. 4 is a flow chart of a method of determining an estimated available bandwidth for transmitting an encoded video stream across a network by a receiving station.

FIG. 4 is a flow chart of a method 110 of determining an estimated available bandwidth for transmitting an encoded video stream across a network 28 by receiving station 30. In one implementation, the method is carried out by the receive-side control 86. First, at stage 112, the receive-side control 86 receives information about a received frame. The information includes the transmitting station timestamp (which is either the send time or the capture time of the frame), the actual receive time of the frame, the size of the frame, and the position of the frame within the video stream.

Next, at stage 114, an estimated function is determined using adaptive filter 88. The estimated function is based on the inter-arrival time differential d and the inter-frame size differential dL of at least some of the frames that have been previously received and includes an estimated slope and offset. Use of the inter-frame size differential dL allows for a more accurate offset than only using the inter-arrival time differential without respect to frame size. The inter-arrival time differential $d_i$ of a frame i is the difference in network transmission time of successive frames in the video stream, as defined by this formula:

$$d_i = t_i - t_{i-1} - (T_i - T_{i-1}); \text{ wherein} \quad (1)$$

$t_i$ is the receive time of frame i; $t_{i-1}$ is the receive time of a frame i−1 that immediately precedes the current frame I; $T_i$ is the timestamp (send time or capture time) of frame i; and $T_{i-1}$ is the timestamp of frame i−1.

The inter-frame size differential $dL_i$ for a frame i is the difference in frame size of successive frames in the video stream, as defined by this formula:

$$dL_i = L_i - L_{i-1}; \text{ wherein} \quad (2)$$

$L_i$ is the frame size of frame i; and $L_{i-1}$ is the frame size of frame i−1.

In one exemplary implementation, the estimated function is estimated using a Kalman filter. To utilize a Kalman filter, the process of transmitting frames over the network is modeled. For any frame i, a model $D_i$ of inter-arrival time $d_i$ can be defined using the following formula:

$$D_i = \frac{dL_i}{C_{min}} + w_i; \text{ wherein} \quad (3)$$

$w_i$ is a sample from a stochastic process W for frame i.

In formula (3), the stochastic process W is a function of the capacity $C_{min}$, the current cross traffic $X_i$, and the current video stream bitrate $R_i$. W is modeled as a white Gaussian process with a variance of $\sigma_w^2$. If the current video stream bitrate $R_i$ exceeds the current available bandwidth $A_{min}$ (over-use condition), then $w_i$ will have a mean greater than zero. Alternatively, if the current video stream bitrate $R_i$ is less than the current available bandwidth, then $w_i$ can have a mean less than zero for limited periods of time. Sample $w_i$ can have a mean less than zero during a time period which the network is recovering from a over-use condition (under-use condition).

If the current video stream bitrate $R_i$ is equal to or less than the current available bandwidth $A_{min}$ and the network is not recovering from an over-use condition (steady-state condition), then the mean of $w_i$ will be zero. The mean of $w_i$ can be split out from the noise portion of $w_i$ using formula (3) as follows:

$$D_i = \frac{1}{C_{min,i}} dL_i + m_i + v_i; \text{ wherein} \quad (4)$$

$C_{min,i}$ is the capacity $C_{min}$ as measured for frame i; $m_i$ is the mean of $w_i$ for frame i; and $v_i$ is the noise portion of $w_i$ for frame i.

The estimated function with respect to $C_{min,i}^{-1}$ and $m_i$ is modeled in a form usable by the Kalman filter using matrix $\bar{\theta}_i$ for frame i as follows:

$$\bar{\theta}_i = \begin{bmatrix} C_{min,i}^{-1} \\ m_i \end{bmatrix} \quad (5)$$

The next values of $\bar{\theta}_{i+1}$ for the next frame i+1 can be modeled as follows:

$$\bar{\theta}_{i+1} = \bar{\theta}_i + \bar{u}_i; \text{ wherein} \quad (6)$$

$\bar{u}_i$ is a zero-mean white Gaussian process noise having a model covariance $Q_i$ defined as:

$$Q_i = E\{\bar{u}_i \bar{u}_i^T\}; \text{ wherein} \quad (7)$$

E(x) signifies the mathematical expectation of random variable x, which is a weighted average of all possible values of x.

The model $D_i$ can be restated in terms of $\bar{\theta}_i$ as follows:

$$D_i = \bar{h}_i^T \bar{\theta}_i + v_i; \text{ wherein} \quad (8)$$

$\bar{h}_i^T$ is the transpose of $\bar{h}_i$, $\bar{h}_i$ being defined as:

$$\bar{h}_i = \begin{bmatrix} dL_i \\ 1 \end{bmatrix} \quad (9)$$

The matrix $\bar{\theta}_i$ of the model is restated as an estimate $\hat{\theta}_i$, which will be the output from the Kalman filter. The estimate $\hat{\theta}_i$ is defined as:

$$\hat{\theta}_i = \begin{bmatrix} \hat{C}_{min,i}^{-1} \\ \hat{m}_i \end{bmatrix}; \text{ wherein} \quad (10)$$

$\hat{C}_{min,1}^{-1}$ is the estimated slope (i.e. inverse capacity) as determined at frame i; and $\hat{m}_i$ is the estimated offset at frame i.

The estimate $\hat{\theta}_i$ is determined using the Kalman filter using the following estimation formula:

$$\hat{\theta}_i = \hat{\theta}_{i-1} + z_i \bar{K}_i; \text{ wherein} \quad (11)$$

$\hat{\theta}_{i-1}$ is the estimate of the previous frame i−1;

$z_i$ is the measurement value, defined as:

$$z_i = d_i - \bar{h}_i^T \hat{\theta}_{i-1}; \text{ and} \quad (12)$$

$\bar{K}_i$ is the Kalman Gain, defined as:

$$\bar{K}_i = \frac{P_{i-1} \bar{h}_i}{\hat{\sigma}_{v,i}^2 + \bar{h}_i^T P_{i-1} \bar{h}_i}; \text{ wherein} \quad (13)$$

$P_{i-1}$ is the error covariance previously determined for the previous frame i−1, the error covariance $P_i$ for any frame i being defined as:

$$P_i = (1 - \bar{K}_i \bar{h}_i^T) P_{i-1} + \hat{Q}_i; \text{ wherein} \quad (14)$$

$\hat{Q}_i$ is an estimated covariance of the zero-mean white Gaussian process noise $\bar{u}_i$, $\hat{Q}_i$, defined as:

$$\hat{Q}_i = \begin{bmatrix} \frac{30}{1000 f_{max}} \times 10^{-10} & 0 \\ 0 & \frac{30}{1000 f_{max}} \times 10^{-2} \end{bmatrix}; \quad (15)$$

$\hat{\sigma}_{v,i}^2$ is the variance of v measured at frame i, defined as:

$$\hat{\sigma}_{v,i}^2 = \beta \hat{\sigma}_{v,i-1}^2 + (1-\beta) z_i^2; \text{ wherein} \quad (16)$$

β is defined as:

$$\beta = (1-\alpha)^{\frac{30}{1000 f_{max}}}; \text{ wherein} \quad (17)$$

α is a filter constant, typically chosen from within the interval [0.001,0.1]; and
$f_{max}$ is the highest rate at which frames have been captured within the last N frames, defined as:

$$f_{max} = \max\left\{\frac{1}{T_i - T_{i-1}}, \frac{1}{T_{i-1} - T_{i-2}}, \ldots, \frac{1}{T_{i-N} - T_{i-N-1}}\right\} \quad (18)$$

As shown in formula (12), the measurement value $z_i$, is defined using the inter-arrival time differential $d_i$, the inter-frame size differential $dL_i$, and the previous estimate $\hat{\theta}_{i-1}$. Formula (12) is defined with the assumption that $v_i$ is a random variable with samples drawn from a zero-mean white Gaussian process. In some cases, that assumption may be incorrect, so an outlier filter is used with the determination of $z_i$. If $z_i$ is greater than $3\sqrt{\hat{\sigma}_{v,i}^2}$ when using formula (12), the value of $z_i$ is replaced with $3\sqrt{\hat{\sigma}_{v,i}^2}$. If $z_i$ is less than $-3\sqrt{\hat{\sigma}_{v,i}^2}$ when using formula (12), the value of $z_i$ is replaced with $-3\sqrt{\hat{\sigma}_{v,i}^2}$. In other words, $3\sqrt{\hat{\sigma}_{v,i}^2}$ is the maximum value of $z_i$ and $-3\sqrt{\hat{\sigma}_{v,i}^2}$ is the minimum value of $z_i$. Other outlier filters may alternatively be used.

The Kalman Gain $\overline{K}_i$ as defined in formula (13) is a gain vector. The gain vector includes gain values for each of $$\hat{C}_{min,i}^{-1}$$

and $\hat{m}_i$. The gain values dictate the response time of the Kalman filter to incorporate changes in the input values $d_i$ and $dL_i$, into the estimated values. The gain values incorporate the error covariance $P_{i-1}$ determined for the previous frame i−1 and a noise variance $\hat{\sigma}_{v,i}^2$ calculated as of frame i.

The error covariance $P_i$ is determined using an estimated covariance $\hat{Q}_i$. The estimated covariance $\hat{Q}_i$ is a matrix of values approximating the model covariance $\overline{Q}_i$. In this case, position (1,1) of the matrix contains the estimated variance of $C_{min,i}$ and position (2,2) of the matrix contains the estimated variance of $m_i$. The values shown reflect a greater expected variance for the offset $m_i$ than slope $C_{min,i}$. The values are proportional to the frame rate of the video stream, as measured by $f_{max}$.

The disparity in variances reflects an assumption that a change in bandwidth usage as represented by the offset $m_i$ is much more likely than a change in network capacity as represented by $C_{min,i}$. However, different implementations and circumstances may require different assumptions and different values within estimated covariance $\hat{Q}_i$. For example, in the case of a mobile network, the network capacity may vary quickly as compared to other networks. As the expected underlying network conditions change, the values within estimated covariance $\hat{Q}_i$ can be modified using, for example, an iterative analytical process.

The definition of variance $\hat{\sigma}_{v,i}^2$ and estimated covariance $\hat{Q}_i$ parameters each include factor $f_{max}$ that is used to scale the parameters relative to frame rate over time. This scaling factor is included so that the Kalman filter responds within a similar number of frames of the video stream, regardless of the frame rate currently being used. The dynamic nature of this factor enables the Kalman filter to respond to dynamic changes in the video stream frame rate that may occur during real-time video encoding.

The above formulas (5)-(18) illustrate an exemplary implementation of a Kalman filter to estimate the slope and offset of an estimated function of the inter-arrival time differential and the inter-frame size differential of received frames. Other Kalman filter implementations and variations on the exemplary implementation are available. For example, formulas may be added, changed or omitted in alternative implementations. Furthermore, in alternative implementations, a different type of adaptive filter other than a Kalman filter may be used.

Figure 5:
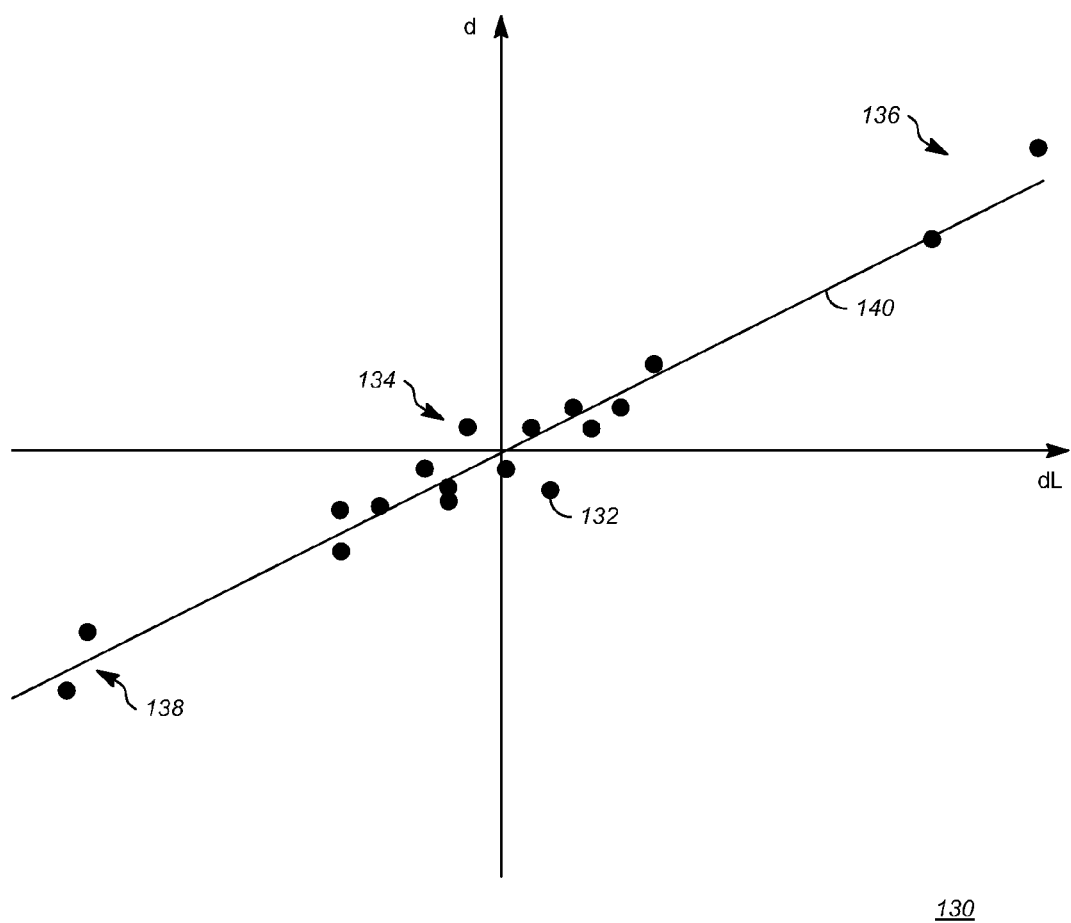
FIG. 5 is an exemplary scatter plot illustrating the inter-arrival time differential and inter-frame size differential of received frames at a steady-state and an estimated function thereof.

FIG. 5 is an exemplary scatter plot 130 illustrating the inter-arrival time differential and inter-frame size differential of received frames and an estimated function 140 thereof. The scatter plot 130 includes a y-axis corresponding to the inter-arrival time differential d and an x-axis corresponding to the inter-frame size differential dL of received frames. Frames are plotted on the scatter plot 130 using their associated d and dL values, including frame 132.

The scatter plot 130 includes three areas of plotted frames. Area 134 includes most of the plotted frames and is distributed about the origin of the plot. Area 134 primarily includes inter-predicted P-frames that do not come immediately after an I-frame. Area 136 includes frames having a larger inter-frame size differential dL. Area 136 primarily includes I-frames, which are typically larger than other frames within a video stream. Frames in area 136 generally will have larger inter-arrival time values than frames in other areas since the relatively increased size of the frames requires a corresponding relative increase in network transmission time.

Area 138 includes frames that have a smaller frame size than the immediately preceding frame. For example, area 138 can include P-frames that come immediately after an I-frame, since P-frames are typically smaller than I-frames. Frames in area 138 require relatively less network transmission time than the immediately preceding frame due to their relatively smaller size.

Estimated function 140 is an estimated function of the plotted frames. Estimated function 140 can be determined using a Kalman filter or other method as described above. In this example, the estimated function 140 has a zero-offset, showing the network in a steady-state condition.

Referring back to FIG. 4, at stage 116, network over-use or under-use is detected using over-use detector 90. The over-use detector 90 detects whether the network is in a steady-state, under-use, or over-use condition. The over-use detector 90 performs this detection based on the estimated offset $\hat{m}_i$, an over-use threshold $\gamma_1$, and an under-use threshold $-\gamma_1$. In other implementations, the over-use threshold and under-use threshold may be separately pre-determined.

An over-use indication exists when $\hat{m}_i > \gamma_1$, an under-use indication exists when $\hat{m}_i < -\gamma_1$ and otherwise, the network is in steady-state. However, an over-use or under-use is only detected by the over-use detector 90 if the associated indication is maintained for $\gamma_2$ milliseconds and $\gamma_3$ frames. This requirement filters out what would be false detections caused by brief spikes in offset $\hat{m}_i$. Alternative implementations may filter the over-use and under-use detection differently. In one example, an over-use or under-use is detected when one of $\gamma_2$ milliseconds or $\gamma_3$ frames is reached while an indication is maintained. In another example, there may be no filter, and an over-use or under-use is detected immediately once there is an over-use or under-use indication.

Figure 6:
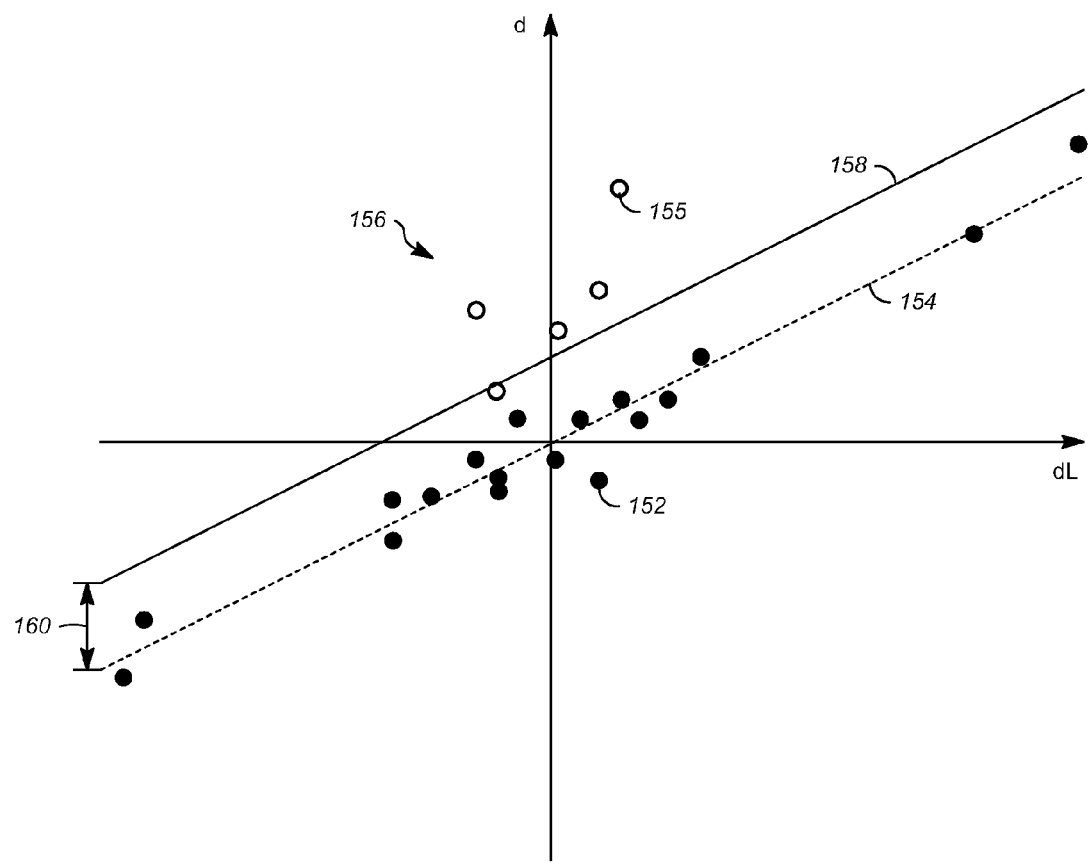
FIG. 6 is an exemplary scatter plot illustrating the inter-arrival time differential and inter-frame size differential of received frames during an over-use condition and an estimated function thereof.

FIG. 6 is an exemplary scatter plot 150 illustrating the inter-arrival time differential and inter-frame size differential of received frames during an over-use condition and an updated estimated function 158 thereof. Scatter plot 150 is based on the plot 130 and also includes additional received frames 156, such as additional received frame 155. Scatter plot 150 includes plotted frames, such as frame 132 and illustrates estimated function 140 from plot 130 showing the previous steady-state condition. Updated estimated function 158 is an estimated function of the plotted frames including the additional received frames 156.

The additional received frames 156 have an increased inter-arrival time differential as compared to the previously received frames shown in plot 130. The increased inter-arrival time differentials results in a positive offset 160 in the estimated function 158. The positive offset 160 can result in an indication of over-use if the positive offset 160 value is greater than the threshold value.

Referring back to FIG. 4, at stage 118, the rate control state is determined and the estimated available bandwidth is determined. The method includes three rate control states: increase, decrease, and hold. The rate control state is used to determine the methodology used to determine the estimated available bandwidth.

Figure 7:
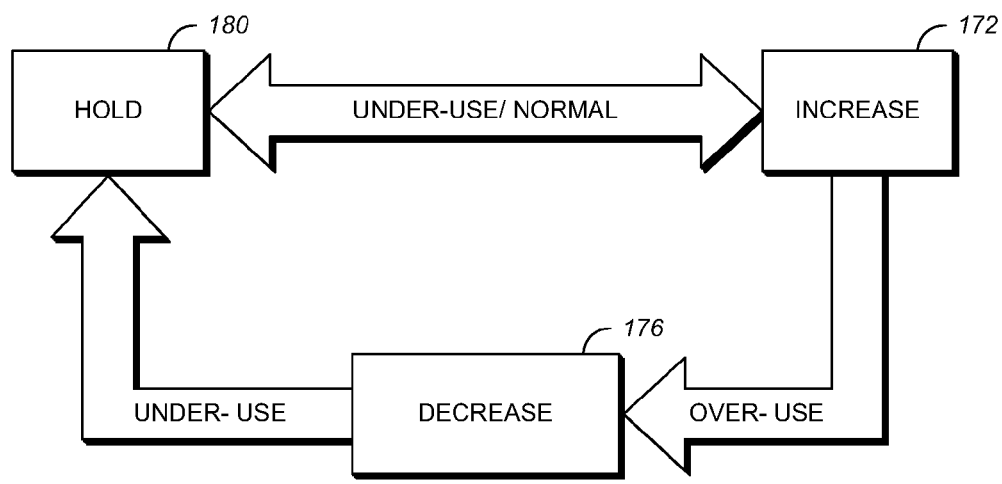
FIG. 7 is a state diagram of rate control states used within the method of FIG. 4.

FIG. 7 is a state diagram 170 of rate control states used within the method of FIG. 4. At the beginning of a video stream, the rate control state is initialized to the increase state 172. The estimated available bandwidth is increased when the rate control state is increase state 172. The rate control state can then transition to the decrease state 176 once an over-use condition is detected. The estimated available bandwidth is decreased when the rate control state is decrease state 176.

The rate control state then transitions to the hold state 180 once an under-use condition is detected. The estimated available bandwidth is maintained at a same value once the rate control state is set to hold state 180. Once the under-use condition ends, the rate control state transitions to increase state 172. The rate control state can transition back to hold state 180 from increase state 172 if another under-use condition is detected.

The rate control states and transitions described above are exemplary and may be different in some implementations. For example, the rate control state can be configured to transition from decrease state 176 to increase state 172, for example, after a certain amount of time has passed after an over-use condition ends and an under-use condition has not yet begun. Depending on the thresholds chosen to detect over-use and under-use, this may happen if there is a mild over-use of the network that does not cause a subsequent under-use.

In another example, the rate control state can be configured to transition to a temporary hold state similar to hold state 180 once an over-use or under-use is indicated but not yet detected. For example, if an over-use is indicated, the estimated available bandwidth will be held at a same value either until the over-use is detected (at which time the state would change to decrease state 176). Alternatively, if an under-use is indicated, the estimated available bandwidth will be held at a same value either until the under-use is detected (at which time the state would change to hold state 180).

Figure 8:
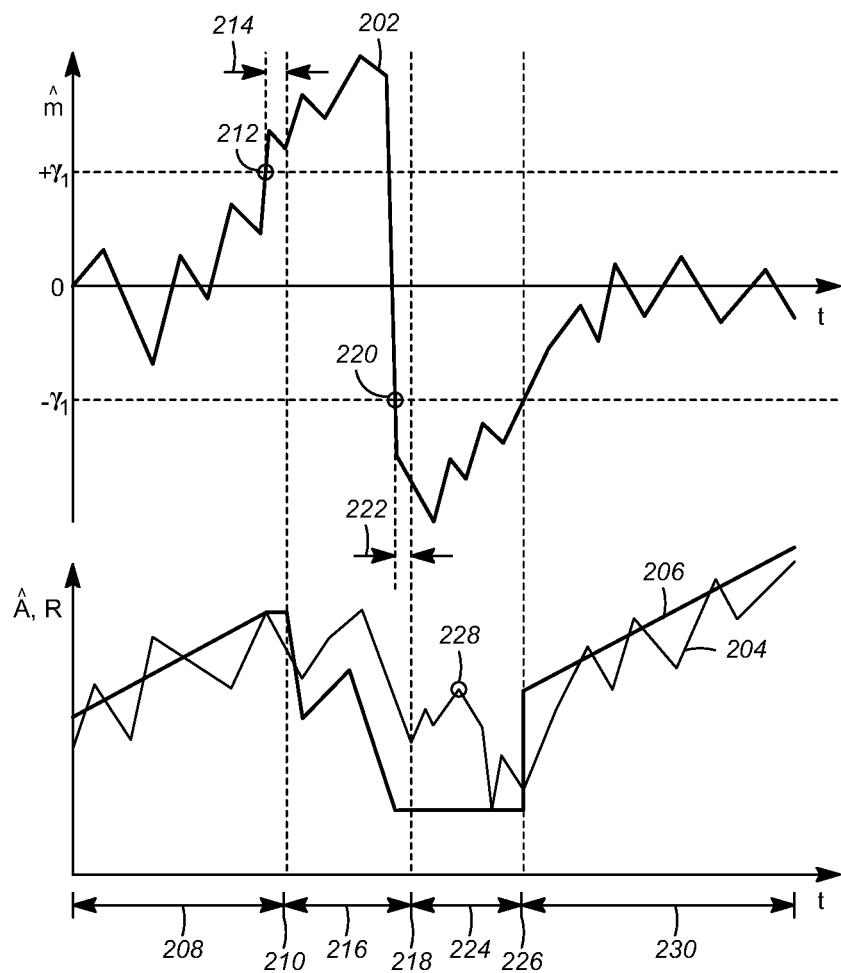
FIG. 8 is an exemplary graph illustrating the estimated offset, estimated available bandwidth, encoded video stream bitrate, and rate control state within the method of FIG. 4.

FIG. 8 is an exemplary graph 200 illustrating the estimated offset, estimated available bandwidth, encoded video stream bitrate, and rate control state within the method of FIG. 4. The graph 200 includes an estimated offset plot 202, an encoded video stream bitrate plot 204, and an estimated available bandwidth plot 206. As explained previously, the rate control state starts in the increase state 172. The increase state is maintained for an initial increase state time period 208. During time period 208, the estimated available bandwidth $\hat{A}_i$ is increased, and an encoded video stream bitrate $R_i$ is shown to increase as a result of the increase of estimated available bandwidth $\hat{A}_i$. In this example, the estimated available bandwidth $\hat{A}_i$ is maintained at a same value in a temporary hold state once an over-use is indicated at point 212. The estimated available bandwidth $\hat{A}_i$ is increased using this formula:

$$\hat{A}_i = \eta \hat{A}_{i-1}; \text{wherein} \tag{19}$$

$\hat{A}_{i-1}$ is the previously determined estimated available bandwidth for the previous frame i−1; and η is an increase factor, defined using the function:

$$\eta(T_{r,i}, \hat{\sigma}_{v,i}^2) = 1.001 + \frac{B}{1 + e^{q(rT_{r,i} - (c_1 \hat{\sigma}_{v,i}^2 + c_2))}}; \text{wherein} \tag{20}$$

$T_{r,i}$ is the round-trip time at frame i; B is a pre-determined constant; q is a pre-determined constant; r is a pre-determined constant; $c_1$ is a pre-determined constant; and $c_2$ is a pre-determined constant.

Figure 9:
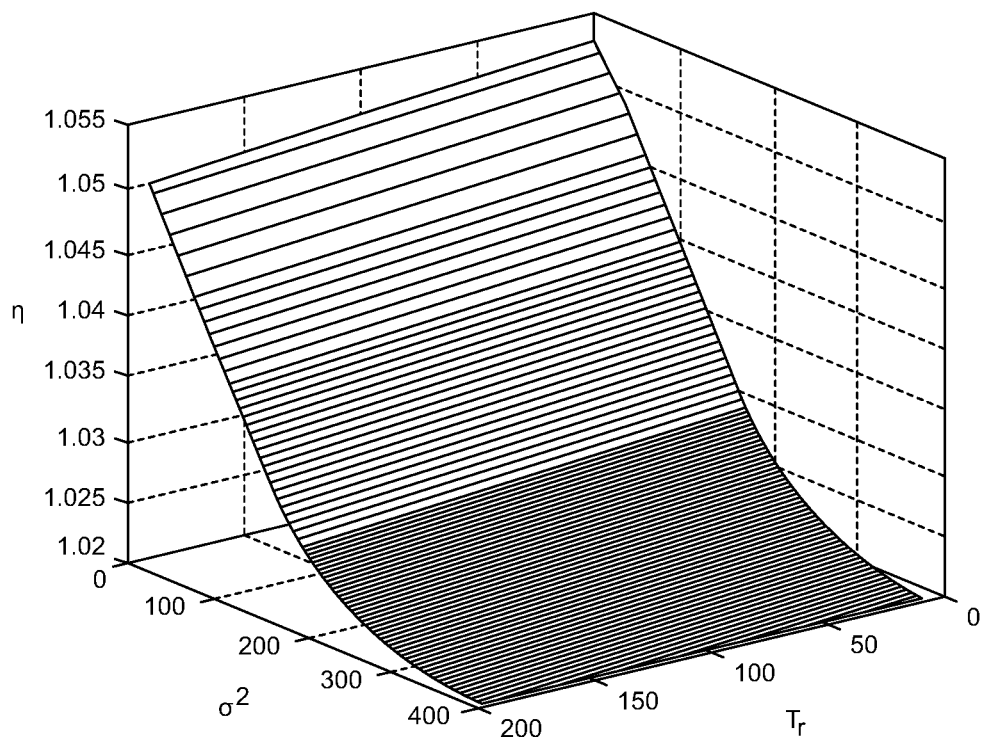
FIG. 9 is an exemplary plot illustrating the determination of the increase factor used to calculate the estimated available bandwidth during the increase rate control state.

FIG. 9 is an exemplary plot illustrating the determination of the increase factor η used to calculate the estimated available bandwidth $\hat{A}_i$ during the increase rate control state. Exemplary plot 250 is a three-dimensional plot having axes for $T_{r,i}$, $\hat{\sigma}_{v,i}^2$, and η. In this implementation of the increase factor η, the values of η are based on the input values shown and these values selected for the pre-determined constants: B=0.0407, q=0.0025, r=0.85, $c_1$=−6.1524, and $c_2$=800. However, alternative values for the pre-determined constants may be used. Additionally, alternative formulas may be used to obtain the value of η. The range of values for η in some implementations may be different than the range shown.

Referring back now to FIG. 8, other implementations may increase the estimated available bandwidth $\hat{A}_i$ in alternative ways. For example, $\hat{A}_i$ can be increased using formula 19 with an offset. Alternatively, $\hat{A}_i$ can be increased using any function of $\hat{A}_{i-1}$.

The increase of the estimated available bandwidth $\hat{A}_i$ as shown above relies on an eventual over-use of the network to trigger a change to the decrease state 176. The encoded video stream bitrate $R_i$ is a measurement of the video stream bitrate as it is arriving at the receiving station. In some cases, the estimated available bandwidth $\hat{A}_i$ may increase to a value that exceeds a maximum bitrate that the transmitting station can encode for the video stream. To avoid divergence between the encoded video stream bitrate $R_i$ and the estimated available bandwidth $\hat{A}_i$, $\hat{A}_i$ is limited to a maximum value in this case, as shown by this formula:

$$\hat{A}_i = \max(\hat{A}_i, 1.5R_i); \text{wherein} \tag{21}$$

$R_i$ is measured using the formula:

$$R_i = \frac{1}{t} \sum_{j=0}^{N_t - 1} L_{i-j}; \text{wherein} \tag{22}$$

t is a number of seconds defining the time window over which $R_i$ will be measured; $N_t$ is a number of frames received within t seconds of receipt of frame i; and $L_{i-j}$ is the frame size of frame i-j.

At a first transition time 210, the rate control state changes to decrease state 176. The rate control state change is triggered by the estimated offset plot 202 exceeding the over-use threshold $\gamma_1$ at point 212 and maintaining above the over-use threshold $\gamma_1$ for an over-use threshold period 214. Over-use threshold period 214 can be defined based on a pre-determined number of seconds ($\gamma_2$ milliseconds), pre-determined number of frames ($\gamma_3$ frames), or both. The decrease state 176 is maintained for a decrease time period 216.

In this example, the decrease time period 216 includes a temporary hold state at the end of the period once an under-use is indicated at point 220. The plot 202 reflects a sudden change from an over-use condition to an under-use condition. In other examples and where there is not a sudden change, the decrease time period 216 may end once the over-use condition ends. In such a case, the estimated available bandwidth is decreased during decrease state 176. The estimated available bandwidth is decreased using the formula:

$$\hat{A}_i = \alpha R_i; \text{ wherein} \qquad (23)$$

$\alpha$ is an fraction that is chosen from within an interval [0.8, 0.95].

In some implementations, $\alpha$ can alternatively be chosen from outside of the stated interval.

At a second transition time 218, the rate control state changes to hold state 180. The rate control state change is triggered by the estimated offset plot 202 decreasing below the under-use threshold $-\gamma_1$ for an under-use threshold period 222. Under-use threshold period 222 can be defined based on $\gamma_2$ milliseconds, $\gamma_3$ frames, or both. Under-use threshold period 222 may alternatively use different values than those used to define over-use threshold period 214. The hold state is maintained for a hold time period 224. The hold time period 224 starts at second transition time 218 and ends when estimated offset plot 202 crosses above the under-use threshold. During the hold time period 224, estimated available bandwidth plot 206 is maintained at a same value. The encoded video stream bitrate plot 204 can fluctuate during this time as queued frames within the network are transmitted.

At a third transition time 226, the rate control state changes back to increase state 172. The estimated available bandwidth plot 206 is reset at the third transition time 226 based on the maximum encoded video stream bitrate $R_{max,i}$ 228 during the hold time period 224. The determination of the estimated available bandwidth at the end of the hold time period 224 is defined in this formula:

$$\hat{A}_i = R_{max,i} = \max\{R_i, R_{i-1}, \ldots, R_{i-k}\}; \text{ wherein} \qquad (24)$$

k is the number of frames within the hold time period.

The $R_{max,i}$ value is used to reset the estimated available bandwidth based on the premise that the actual available bandwidth will be equal to or greater than the maximum bitrate observed during the hold time period 224. The increase state 172 is then maintained for the remainder of the graph for a final increase time period 230. The next state after increase state 172 can be either hold state 180 or decrease state 176 depending on whether an under-use or an over-use condition is next detected.

Referring back to FIG. 4, once the estimated available bandwidth $\hat{A}_i$ is determined as of frame i, it is sent to the transmitting station 12 in stage 120. $\hat{A}_i$ can be sent via RTCP to the transmitting station 12 using RTCP sender 94 and RTCP messages 96. $\hat{A}_i$ can be determined and sent at the same rate as the video stream or at a slower rate, for example, five times per second. Alternatively, $\hat{A}_i$ can be determined for each frame, but transmitted as an aggregate for groups of frames at a lower rate than the frame rate. After $\hat{A}_i$ is sent, method 110 ends.

Figure 10:
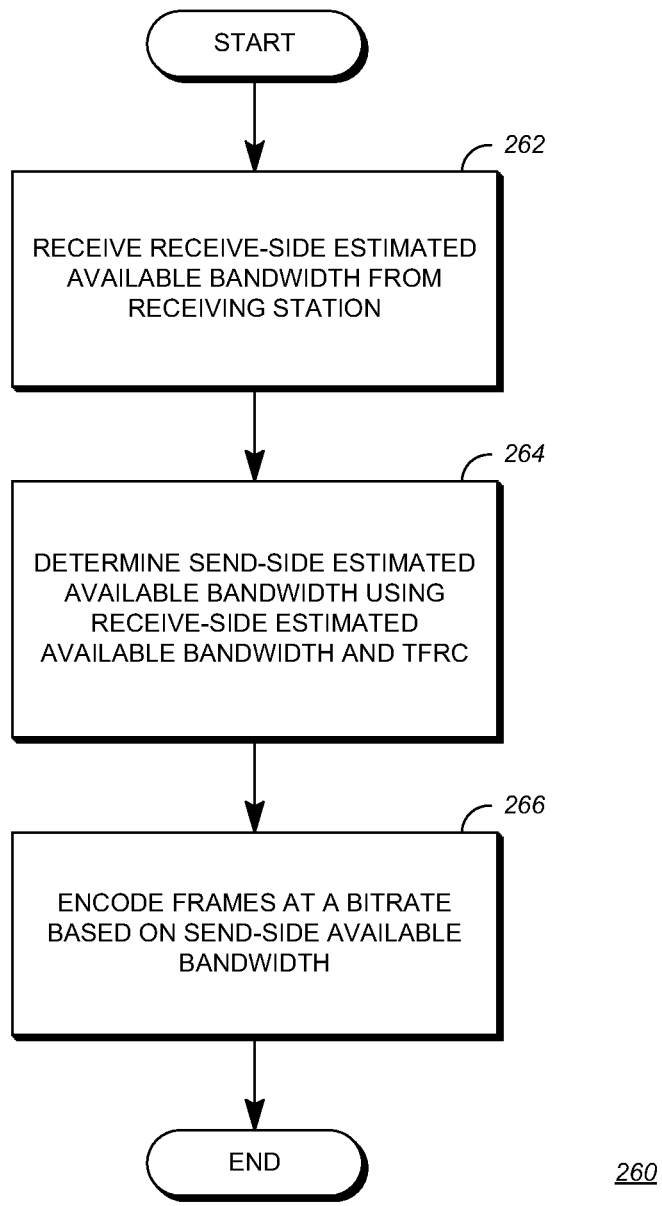
FIG. 10 is a flow chart of a method of regulating the bitrate of an encoded video stream by a transmitting station.

FIG. 10 is a flow chart of a method 260 of regulating the bitrate of an encoded video stream by a transmitting station.

In one implementation, the method is carried out by the send-side control 100. At stage 262, the receive-side estimated available bandwidth $\hat{A}_i$ is received from the receiving station. The receiving can be done using RTCP messages 96 and RTCP receiver 98.

At stage 264, a send-side estimated available bandwidth $\hat{A}_i^s$ is determined using the following formulas:

$$\hat{A}_i^s = 1.05\hat{A}_{i-1}^s + 1000, \text{ if } p<2\%; \qquad (25)$$

$$\hat{A}_i^s = \hat{A}_{i-1}^s, \text{ if } 2\% \leq p \leq 10\%; \text{ and} \qquad (26)$$

$$\hat{A}_i^s = \hat{A}_i - 1^s(1-0.5p), \text{ if } p>10\%; \text{ wherein} \qquad (27)$$

$\hat{A}_{i-1}^s$ is the send-side estimated available bandwidth for frame i−1; and
p is a measure of packet loss The packet loss p is measured over the time between the current receipt of receive-side estimated available bandwidth $\hat{A}_i$ and the last receipt of a receive-side estimated available bandwidth. The last receipt of the receive-side estimated available bandwidth may have occurred be one or more frames in the past. If the packet loss is less than two percent, the send-side estimated available bandwidth $\hat{A}_i^s$ is increased relative to the last send-side estimated available bandwidth $\hat{A}_{i-1}^s$. If the packet loss is between two and ten percent, the send-side estimated available bandwidth $\hat{A}_i^s$ is maintained at its previous value $\hat{A}_{i-1}^s$. If the packet loss is greater than ten percent, the send-side estimated available bandwidth $\hat{A}_i^s$ is decreased from its previous value $\hat{A}_{i-1}^s$ proportionately to the packet loss.

Alternatively, the determination of whether to use formula 25, 26, or 27 to determine the send-side estimated available bandwidth may be based on one or more pre-determined packet loss thresholds. For example an upper packet loss threshold may be used in place of the constant 10% value and a lower packet loss threshold may be used in place of the constant 2% value.

The send-side estimated available bandwidth $\hat{A}_i^s$ is limited such that it does not exceed the receive-side estimated available bandwidth $\hat{A}_i$. It is further limited such that it is equal to or greater than a bandwidth calculated using the using the TCP throughput equation that is a part of the TCP Friendly Rate Control (TFRC) specification. The formulas for both limitations are defined below:

$$\hat{A}_i^s = \min(\hat{A}_i, \hat{A}_i^s); \text{ and} \qquad (28)$$

$$\hat{A}_i^s = \max\left(\hat{A}_i^s, \frac{8s}{R\sqrt{\frac{2bp}{3}} + \left(3t_{RTO}(1+32p^2)p\sqrt{\frac{3bp}{8}}\right)}\right); \text{ wherein} \qquad (29)$$

s is an average packet size in bytes; R is a network round-trip time; b is a number of packets acknowledged by a single TCP acknowledgement; and $t_{RTO}$ is the TCP retransmission timeout value in seconds.

Once the send-side estimated available bandwidth is determined and limited, at stage 266 the transmitting station encodes frames at a bitrate based on the send-side estimated available bandwidth using video encoding 74.

The above-described embodiments of encoding or decoding may illustrate some exemplary encoding techniques. However, in general, encoding and decoding as those terms are used in the claims are understood to mean compression, decompression, transformation or any other change to data whatsoever.

The embodiments of transmitting station 12 and/or receiving station 30 (and the algorithms, methods, instructions etc. stored thereon and/or executed thereby) can be realized in hardware, software, or any combination thereof including, for example, IP cores, ASICS, programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of transmitting station 12 and receiving station 30 do not necessarily have to be implemented in the same manner.

Further, in one embodiment, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a screencasting or a videoconferencing system. Alternatively, transmitting station 12 can be implemented on a server and receiving station 30 can be implemented on a device separate from the server, such as a hand-held communications device (i.e. a cell phone). In this instance, transmitting station 12 can encode content using an encoder into an encoded video signal and transmit the encoded video signal to the communications device. In turn, the communications device can then decode the encoded video signal using a decoder. Alternatively, the communications device can decode content stored locally on the communications device (i.e. no transmission is necessary). Other suitable transmitting station 12 and receiving station 30 implementation schemes are available. For example, receiving station 30 can be a personal computer rather than a portable communications device.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for determining, by a receiving station, an estimated available bandwidth for transmitting a media stream over a network from a transmitting station to the receiving station, the method comprising:

receiving a plurality of frames from the media stream at the receiving station;

determining an inter-arrival time differential d for each frame from the plurality of frames, the inter-arrival time differential $d_i$, for a current frame i calculated as the difference between a network transmission time of the current frame i and a network transmission time of a previous frame i-1 according to $d_i=(t_i-t_{i-1})-(T_i-T_{i-1})$, wherein $t_i$, is a receive time, at the receiving station, of the current frame i, $t_{i-1}$ is a receive time, at the receiving station, of the previous frame i-1 that immediately precedes the current frame i, $T_i$, is a timestamp of the current frame i, and $T_{i-1}$ is a timestamp of the previous frame i-1;

determining an inter-frame size differential dL for each frame from the plurality of frames, the inter-frame size differential $dL_i$, for the current frame i calculated as the difference between a frame size of the current frame i and a frame size of the previous frame i-1 according to $dL_i=L_i-L_{i-1}$, wherein $L_i$ is the frame size of frame i, and $L_{i-1}$ is the frame size of frame i-1;

determining an estimated function by an adaptive filter that uses the inter-arrival time differential d for each frame from the plurality of frames and the inter-frame size differential dL for each frame from the plurality of frames as inputs, the estimated function having a slope $C_i^{-1}$ and an offset $m_i$, wherein the slope $C_i^{-1}$ represents an inverse capacity of the network with respect to the plurality of frames and the offset $m_i$ represents a deviation from a steady-state condition with respect to the plurality of frames; and determining the estimated available bandwidth based on a comparison between the offset $m_i$ and one or more thresholds.

2. The method of claim 1, wherein determining the estimated available bandwidth comprises:

determining the estimated available bandwidth by increasing a previously determined estimated available bandwidth if a network over-use has not yet been detected during transmission of the media stream.

3. The method of claim 2, wherein determining the estimated available bandwidth further comprises:

detecting a network over-use if the offset $m_i$ exceeds an over-use threshold for at least one of a first pre-determined number of seconds or a first pre-determined number of frames; and determining the estimated available bandwidth based on a fraction of a bitrate of the media stream when the network over-use is detected.

4. The method of claim 3, wherein determining the estimated available bandwidth further comprises:

detecting a network under-use if the offset $m_i$ is less than an under-use threshold for at least one of a second pre-determined number of seconds or a second pre-determined number of frames; and determining the estimated available bandwidth as equal to the previously determined estimated available bandwidth.

5. The method of claim 4, wherein determining the estimated available bandwidth further comprises:

detecting a return to a steady-state range from a previously detected network under-use when the offset $m_i$ exceeds the under-use threshold; and determining the estimated available bandwidth as a maximum bitrate of the media stream measured during the previously detected network under-use.

6. The method of claim 5, wherein determining the estimated available bandwidth further comprises:
determining the estimated available bandwidth by increasing a previously determined estimated bandwidth if the return to the steady-state range was previously detected.

7. The method of claim 6, wherein determining the estimated available bandwidth further comprises:
limiting the determined estimated available bandwidth to a maximum value equal to 150% of the bitrate of the media stream.

8. The method of claim 1, further comprising:
sending the determined estimated available bandwidth to a transmitting station.

9. The method of claim 8, further comprising:
updating the determined estimated available bandwidth based on a measure of packets lost while transmitting the media stream.

10. The method of claim 9, wherein updating the determined estimated available bandwidth comprises:
determining a send-side estimated available bandwidth based on a previously determined send-side estimated available bandwidth, wherein:
the send-side estimated available bandwidth is an increase of the previously determined send-side estimated available bandwidth if the measure of packets lost is less than a first packet loss threshold,
the send-side estimated available bandwidth is a decrease of the previously determined send-side estimated available bandwidth if the measure of packets lost is greater than a second packet loss threshold, and
the send-side estimated available bandwidth is otherwise equal to the previously determined send-side estimated available bandwidth; and
updating the determined estimated available bandwidth as the send-side estimated available bandwidth, the updated estimated available bandwidth limited by at least one of an upper bound equal to the determined estimated available bandwidth or a lower bound defined using TCP Friendly Rate Control.

11. The method of claim 10, further comprising:
determining a target bitrate using the updated estimated available bandwidth; and
encoding the media stream using the target bitrate before transmitting the media stream.

12. The method of claim 1, wherein the media stream is transmitted over the network using RTP and the determined estimated available bandwidth is sent using RTCP.

13. A method of regulating a bitrate of a media stream encoded by a transmitting station based on an estimated available bandwidth of a network determined by a receiving station, the method comprising:
receiving a plurality of frames from the media stream by the receiving station, the plurality of frames each having an inter-arrival time differential $d_i$ and an inter-frame size differential $dL_i$, the inter-arrival time for each frame given by $d_i=(t_i-t_{i-1})-(T_i-T_{i-1})$, wherein
$t_i$ is a receive time of a current frame i,
$t_{i-1}$ is a receive time of the previous frame i-1 that immediately precedes the current frame i,
$T_i$ is a timestamp of the current frame i, and
$T_{i-1}$ is a timestamp of the previous frame i-1, and
the inter-frame size differential for each frame given by $dL_i=L_i-L_{i-1}$, wherein
$L_i$ is the frame size of frame i, and
$L_{i-1}$ is the frame size of frame i-1;
estimating a relationship between the inter-arrival time differential and the inter-frame size differential by an adaptive filter that uses the inter-arrival time differential $d_i$ for each frame from the plurality of frames and the inter-frame size differential $dL_i$ for each frame from the plurality of frames as inputs and determines a function having a slope $C_i^{-1}$ and an offset $m_i$ wherein the slope $C_i^{-1}$ represents an inverse capacity of the network with respect to the plurality of frames and the offset $m_i$ represents a deviation from a steady-state condition with respect to the plurality of frames;
detecting an available bandwidth over-use if the offset $m_i$ is greater than a positive threshold;
detecting an available bandwidth under-use if the offset $m_i$ is less than a negative threshold;
determining the estimated available bandwidth based on whether there is a detected over-use or under-use using a processor; and
regulating the bitrate of the encoded media stream by sending the estimated available bandwidth to the transmitting station.

14. The method of claim 13, wherein determining the estimated available bandwidth comprises:
determining the estimated available bandwidth based on an increase of a previously determined estimated available bandwidth if neither an over-use or an under-use is detected.

15. The method of claim 13, wherein determining the estimated available bandwidth comprises:
determining the estimated available bandwidth based on a decrease of a bitrate of the transmitted media stream if an over-use is detected or if an over-use was previously detected and an under-use has not been detected after the over-use detection.

16. The method of claim 13, wherein determining the estimated available bandwidth comprises:
determining the estimated available bandwidth by maintaining the estimated available bandwidth at a constant value if an under-use is detected, the constant value defined as an estimated available bandwidth previously determined just prior to the under-use detection.

17. The method of claim 13, wherein regulating the bitrate of the encoded media stream comprises:
sending the estimated available bandwidth to the transmitting station;
determining a bitrate for encoding at least some subsequent frames of the media stream using the estimated available bandwidth; and
encoding the at least some subsequent frames of the media stream using the determined bitrate.

18. A method for estimating, at a receiving station, available bandwidth for transmitting a media stream over a network from a transmitting station to the receiving station, the method comprising:
receiving a plurality of frames from the media stream at the receiving station, each frame of the plurality of frames having an inter-frame size differential $dL_i$ and an inter-arrival time differential $d_i$, the inter-arrival time for each frame given by $d_i=(t_i-t_{i-1})-(T_i-T_{i-1})$ , wherein
$t_i$ is a receive time, at the receiving station, of a current frame i,
$t_{i-1}$ is a receive time, at the receiving station, of the previous frame i-1 that immediately precedes the current frame i,
$T_i$, is a timestamp of the current frame i, and
$T_{i-1}$ is a timestamp of the previous frame i-1, and the inter-frame size differential for each frame given by $dL_i=L_i-L_{i-1}$, wherein
$L_i$ is the frame size of frame i, and
$L_{i-1}$ is the frame size of frame i-1;

determining an estimated function by an adaptive filter that uses the inter-arrival time differential for each frame from the plurality of frames and the inter-frame size differential for each frame from the plurality of frames as inputs, the estimated function having a slope $C_i^{-1}$ and an offset $m_i$, wherein the slope $C_i^{-1}$ represents an inverse capacity of the network with respect to the plurality of frames and the offset $m_i$ represents a deviation from a steady-state condition with respect to the plurality of frames;

determining a steady-state range using the slope $C_i^{-1}$ of the estimated function and at least one pre-determined threshold value;

detecting if at least some of the inter-arrival time differentials are outside of a steady-state range using at least some of the inter-frame size differentials; and estimating an available bandwidth based on the detection using a processor.

19. The method of claim 18, wherein estimating the available bandwidth comprises:
if the estimated function is within the steady-state range:
identifying a previously estimated available bandwidth, and
estimating the available bandwidth by increasing the previously estimated available bandwidth.

20. The method of claim 18, wherein estimating the available bandwidth comprises:
if the estimated function is greater than the steady-state range:
identifying a bitrate of the media stream, and
estimating the available bandwidth as a percentage of the bitrate.

21. The method of claim 18, wherein estimating the available bandwidth comprises:
if the estimated function is less than the steady-state range:
identifying a previously estimated available bandwidth, and
estimating the available bandwidth as the previously estimated available bandwidth.

22. A computing device for estimating available bandwidth for transmitting a media stream over a network, the computing device comprising:
a memory; and
a processor configured to execute instructions stored in the memory to:
receive a plurality of frames from the media stream, each frame of the plurality of frames having an inter-frame size differential $dL_i$ and an inter-arrival time differential $d_i$, the inter-arrival time for each frame given by $d_i=(t_i-t_{i-1})-(T_i-T_{i-1})$, wherein
$t_i$ is a receive time of a current frame i,
$t_{i-1}$ is a receive time of the previous frame i-1 that immediately precedes the current frame i,
$T_i$ is a timestamp of the current frame i, and
$T_{i-1}$ is a timestamp of the previous frame i-1, and
the inter-frame size differential for each frame given by $dL_i=L_i-L_{i-1}$, wherein
$L_i$ is the frame size of frame i, and
$L_{i-1}$ is the frame size of frame i-1;
determine an estimated function by an adaptive filter that uses the inter-arrival time differential d for each frame from the plurality of frames and the inter-frame size differential dL for each frame from the plurality of frames as inputs, the estimated function having a slope $C_i^{-1}$ and an offset $m_i$, wherein the slope $C_i^{-1}$ represents an inverse capacity of the network with respect to the plurality of frames and the offset $m_i$ represents a deviation from a steady-state condition with respect to the plurality of frames;
determine a steady-state range using the slope $C_i^{-1}$ of the estimated function and at least one pre-determined threshold value;
detect whether at least some of the inter-arrival time differentials are outside of the steady-state range using at least some of the inter-frame size differentials; and
estimate an available bandwidth based on the detection.

23. A computing device for estimating available bandwidth for transmitting a media stream over a network, the computing device comprising:
an RTP receiver configured to receive a plurality of frames from the media stream over the network, each frame having an inter-arrival time differential $d_i$ and an inter-frame size differential $dL_i$, the inter-arrival time for each frame given by $d_i=(t_i-t_{i-1})-(T_i-T_{i-1})$, wherein
$t_i$ is a receive time of a current frame i,
$t_{i-1}$ is a receive time of the previous frame i-1 that immediately precedes the current frame i,
$T_i$ is a timestamp of the current frame i, and
$T_{i-1}$ is a timestamp of the previous frame i-1, and
the inter-frame size differential for each frame given by $dL_i=L_i-L_{i-1}$, wherein
$L_i$ is the frame size of frame i, and
$L_{i-1}$ is the frame size of frame i-1;
an adaptive filter configured to determine an estimated function of a relationship between the inter-arrival time differential and the inter-frame size differential based on inter-arrival time differential and inter-frame size differential for the plurality of frames, the estimated function having a slope and an offset;
an over-use detector configured to detect an over-use or under-use of the network based on a comparison between the offset and one or more pre-determined thresholds; and
a remote rate-control configured to determine an estimated available bandwidth based on the detection of an over-use or under-use by the over-use detector.

24. The computing device of claim 23, wherein the slope of the estimated function represents an inverse capacity of the network with respect to the plurality of frames and the offset represents a deviation from a steady-state condition with respect to the plurality of frames.

* * * * *